United States Patent
Kritchman et al.

(10) Patent No.: US 8,278,866 B2
(45) Date of Patent: Oct. 2, 2012

(54) METHOD AND APPARATUS FOR ACCURATE POSITIONING OF PRINTING UNITS

(75) Inventors: Eliahu M. Kritchman, Tel Aviv (IL); Alexander Libinson, Holon (IL)

(73) Assignee: Objet Ltd., Rehovot (IL)

( * ) Notice: Subject to any disclaimer, the term of this patent is extended or adjusted under 35 U.S.C. 154(b) by 644 days.

(21) Appl. No.: 12/364,604

(22) Filed: Feb. 3, 2009

(65) Prior Publication Data

US 2010/0194813 A1    Aug. 5, 2010

(51) Int. Cl.
*B64C 17/06* (2006.01)
*G05B 19/40* (2006.01)
*B41J 2/15* (2006.01)

(52) U.S. Cl. ........... 318/649; 318/685; 318/696; 347/16

(58) Field of Classification Search ........... 318/649, 318/685, 696; 347/16
See application file for complete search history.

(56) References Cited

U.S. PATENT DOCUMENTS

| | | | | |
|---|---|---|---|---|
| 3,991,992 A * | 11/1976 | Randall et al. | | 270/52.07 |
| 4,167,833 A * | 9/1979 | Farina et al. | | 49/199 |
| 4,231,190 A * | 11/1980 | Tieben | | 49/25 |
| 4,352,348 A * | 10/1982 | Griffith | | 124/78 |
| 4,691,153 A * | 9/1987 | Nishimura | | 318/696 |
| 4,775,825 A * | 10/1988 | Moribe et al. | | 318/696 |
| 5,053,685 A | 10/1991 | Bacchi | | |
| 5,767,645 A | 6/1998 | Park | | |
| 6,285,498 B1 | 9/2001 | Mayer | | |
| 6,561,607 B1 * | 5/2003 | Lubinsky et al. | | 347/8 |
| 6,695,505 B2 | 2/2004 | Limura et al. | | |
| 2004/0226395 A1 | 11/2004 | Diana et al. | | |
| 2006/0151129 A1 * | 7/2006 | Van Klompenburg et al. | | 160/107 |
| 2008/0267660 A1 * | 10/2008 | Schneider et al. | | 399/119 |
| 2009/0150108 A1 * | 6/2009 | MacManus et al. | | 702/95 |
| 2009/0231864 A1 * | 9/2009 | Polasek | | 362/418 |

* cited by examiner

*Primary Examiner* — Walter Benson
*Assistant Examiner* — Gabriel Agared
(74) *Attorney, Agent, or Firm* — Pearl Cohen Zedek Latzer, LLP (57) ABSTRACT

Embodiments of the invention are directed to systems and methods for accurate positioning of a unit movable by a drive system. The method may include adjusting tension of a resilient element of the drive system to reduce hysteresis motion errors of the resilient element below a predetermined threshold by performing measurements of the hysteresis motion errors of the resilient element for two or more tension values and selecting a tension value for which the hysteresis motion error is below the threshold.

13 Claims, 7 Drawing Sheets

METHOD AND APPARATUS FOR ACCURATE POSITIONING OF PRINTING UNITS

BACKGROUND OF THE INVENTION

Solid freeform fabrication (SFF) is a collection of processes, such as three-dimensional printing and stereolithography, for manufacturing three-dimensional objects by sequentially depositing layers of a building material. In three-dimensional printing, the object is formed by selectively depositing material from an inkjet print head based on cross sections of the object. Typically, the ink jet print head is supported on a movable print carriage that moves linearly in a main scanning direction (X direction) over a fabrication surface and traverses in a secondary indexing direction (Y direction) for repositioning the print head prior to commencing a new scan in the X direction. The print head is controlled to eject drops of material at appropriate locations pursuant to command of a controller, where the locations correspond to a pattern of pixels corresponding to a cross section of the object. The scanning operation may require high positional precision which is usually achieved by using a high-quality linear encoder to generate trigger pulses for printing. Repositioning the print head along the indexing direction may also require high positional precision. Often, in order to reduce cost, indexing motions are not controlled by an encoder. In these cases, when the motion drive system includes rubber belt system or any other resilient elements, hysteresis errors in the motion, which are unpredictable and therefore cannot be easily corrected, often accrue.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device which may be included in a printing machine, that may manipulate and/or transform data represented as physical (e.g., electronic) quantities within the computer's registers and/or memories into other data similarly represented as physical quantities within the computer's registers and/or memories or other information storage medium that may store instructions to perform operations and/or processes by the printing machine or elements, parts, modules or units of a printing machine.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of printing heads" may include two or more printing heads.

The terms "layer" and "object layer" are used throughout the specification and claims to describe any lamina or film that may represent a cross-section or slice of a 3D object. A layer may be formed and adhered to previously formed and adhered layers in a "layer by layer" fashion to create, build up or form a 3D object.

The terms "X direction", "X" and "scanning direction" as used throughout the specification and claims refers to the direction of relative movement between a dispensing head (printing head) or a printing head assembly and a fabrication tray during selecting dispensing of material from nozzles of the dispensing head onto the fabrication tray. The relative movement may be achieved by moving the dispensing head while the tray is kept motionless, by moving the fabrication tray while keeping the dispensing head motionless or by moving both the printing head and the fabrication tray.

The terms "Y direction", "Y" and "indexing direction" as used herein throughout the specification and claims refers to a direction perpendicular to the scanning direction. The indexing direction is the direction of relative movement between the dispensing head (printing head) and a fabrication tray between one scanning pass and the subsequent scanning pass.

Embodiments of the present invention may include adjusting the tension of a resilient element of a drive system to reduce or eliminate hysteresis motion errors of the resilient element. The adjustment may include performing an iterative adjustment process to select a tension value that results in reducing hysteresis motion errors of the resilient element below a predetermined threshold. Measurements of hysteresis errors at two different tension values may be used to predict a desired tension value which corresponds to a reduced hysteresis error. The adjustment process may include instructing the drive system to move the unit in a first direction to a first end position; instructing the drive system to move the unit in a second direction, opposite the first direction, to a desired middle position; measuring a first middle position to which the unit has arrived; instructing the drive system to move the unit a first distance in the second direction to a second end position; instructing the drive system to move the unit the first distance in the first direction towards the desired middle position; measuring a second middle position to which the unit has arrived; calculating the distance between the first middle position and the second middle position; and changing the tension of the resilient element if the distance between the first middle position and the second middle position that represents the hysteresis error is above a predetermined threshold.

Other embodiments of the present invention may include correcting hysteresis errors in a drive system by predicting the errors and adjusting the movement commands to compensate for the predicted errors. For example, embodiments of the invention may include receiving a request to move a unit connected to the drive system a desired distance, smaller than a first threshold and larger than a second threshold, from a first position to a second position in a desired direction opposite to a direction of a previous movement command; and generating a first and second consecutive commands, the first command is to move the unit in a first direction and the second command is to move the unit in a second direction opposite to the first direction and the first and second commands are to move the unit a distance larger than the first threshold, such that the sum of the first and second commands is equal to a single command to move the unit the desired distance in the desired direction. Embodiments of the invention may further include receiving a request to move the unit a desired distance larger than the first threshold from a third position to a fourth position in a direction opposite to the direction of a previous movement command; and adjusting a command to move the unit the desired distance using an offset parameter.

Embodiment of the present invention may be implemented in various systems that involve linear motion and requires accurate positioning of a unit. For ease of illustration and for clarification, the description below refers to a printing system or a solid freeform fabrication system. It should be, however, understood to a person skilled in art that the invention is not limited in this respect and embodiments of the present invention may be implemented in any system having a drive element and resilient elements. Non limiting examples for such systems include material processing system, computer numerical control (CNC) systems and any other computer-aided systems that may drive a powered mechanical device.

Figure 1A:
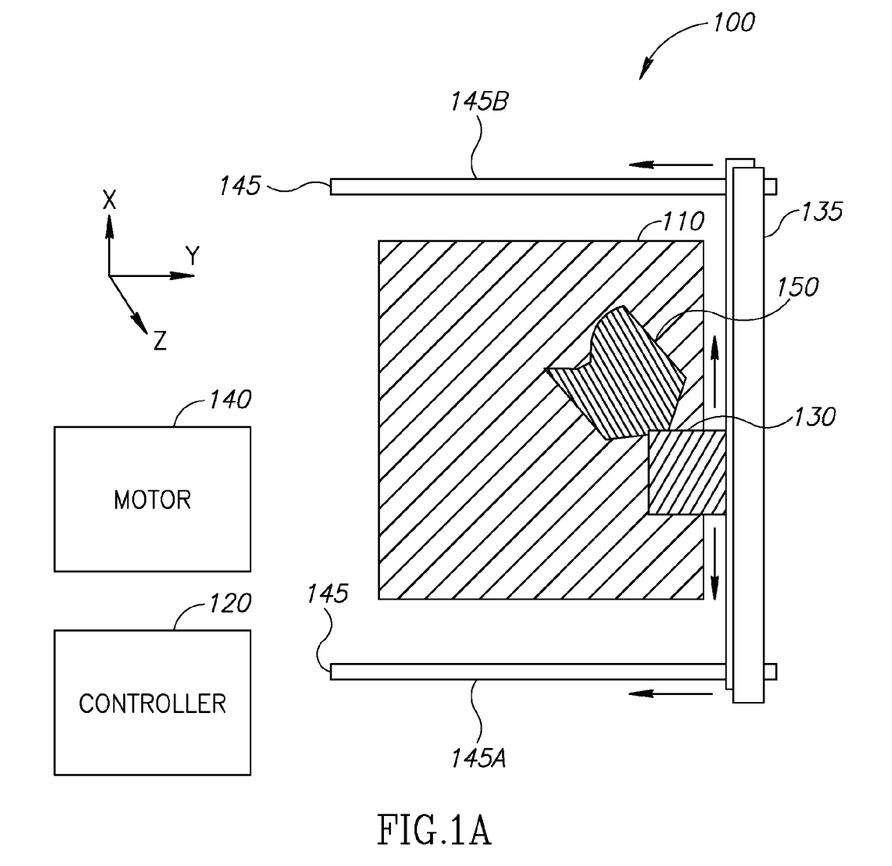
FIG. 1A is a top view illustration of an exemplary SFF system according to embodiments of the invention.

Reference is now made to FIG. 1A, which is a top view illustration of an exemplary printing system according to embodiments of the invention. A solid freeform fabrication (SSF) system 100 may include a fabrication tray 110 and a printing block 130. Fabrication tray 110 may include a horizontal surface to carry layers of a three-dimensional (3D) object 150. The layers may be ordered in a layer by layer fashion, one above the other in the Z direction. Printing block 130 may include, for example, an ink jet head having a plurality of dispensing nozzles which may dispense material, layer by layer, to create the 3D object 150. Printing block 130 may be coupled to first motion assembly (X-motion assembly) 135 to enable linear movement in the main scanning direction (X direction) over fabrication tray 110. X-motion assembly 135 may be a belt system operated by a drive motor (not shown). X-motion assembly 135 may be coupled to a second motion assembly (Y-motion assembly) 145 to enable linear movement of X-motion assembly 135 and printing block 130 in the indexing direction (Y direction). Y-motion assembly 145 may include two rubber belt systems 145A and 145B both coupled to and operated by a motor 140, such as a step motor. Each belt system 145A, 145B may be coupled to an opposite end of X-motion assembly 135.

System 100 may further include a controller 120, such as a microprocessor to control the fabrication process including both the movement of printing block 130 in X direction and X-motion assembly 135 in the Y direction. During printing, printing block 130 may be moved in the X and Y directions according to a desired bit map. Printing block 130 may move across fabrication tray 110 along the X axis in a predefined number of passes. A pass may include movement of the printing head from one side of fabrication tray 110 to the other side in X direction. The X-motion assembly 135 may move according to instructions from controller 120 along the indexing direction Y to a subsequent scanning pass.

When a motion mechanism includes resilient elements, such as for example, rubber belts, hysteresis effect usually occur. As a consequence, an accurate prediction of an actual movement in response to a movement command may not be possible due to non deliberate expansions and contractions of the resilient elements. Embodiments of the invention are directed to a method and apparatus for correcting and/or preventing the hysteresis errors, for example in the Y direction of a printing system, when the motion assembly does not comprise a positional encoder. The correction may be achieved by implementing a software algorithm to reduce hysteresis motion errors of the resilient element below a predetermined threshold, while prevention may be achieved by a calibration procedure, for example, of tension of the resilient element to reduce hysteresis motion errors below a predetermined threshold.

The calibration, adjustment or tuning of Y-motion assembly 145 may be programmed into controller 120. Accordingly, controller 120 may include computer-storage medium having stored thereon instructions including adjustment and calibration steps, scanning plans and limitations which may be used as instructions to perform movements of printing block 130, for example in the Y direction.

Figure 1B:
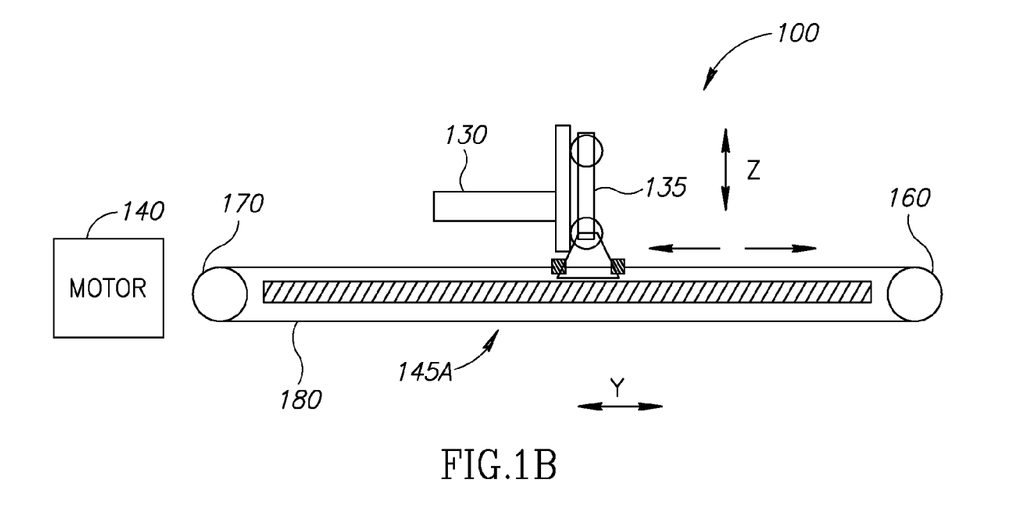
FIG. 1B is a side view illustration of an exemplary SFF system according to embodiments of the invention.

Reference is now made to FIG. 1B, which is a side view illustration of the exemplary SFF system of FIG. 1A. The side view of FIG. 1B shows only one belt system, for example belt system 145A of Y-motion assembly 145 of FIG. 1A. Each of belt systems, 145A and 145B may include a belt 180, a drive wheel 170 coupled to motor 140 and an idle wheel 160 for maintaining the belt tensed. Belt 180 may be a resilient belt made of an elastic material such as, rubber. As shown, X-motion assembly 135 is firmly attached to belt 180 at a fixed point of the belt. Accordingly, when belt 180 is rotated by drive wheel 170, X-motion assembly 135 may move in Y direction. Printing block 130 may be moved along the Y-axis in both directions by rotating wheel 170 to and fro. The use of resilient elements, such as belt 180, in the Y-axis of drive system 100 may cause inaccurate positioning of the printing block or unit, particularly upon change in the direction of motion, due to hysteresis.

Although in the exemplary illustration of FIG. 1B an elastic belt is illustrated, it should be understood to a person skilled in art that the invention is not limited in this respect and embodiments of the present invention directed to reducing and/or correcting hysteresis errors are likewise applicable to any resilient, elastic or flexible element of a drive system.

Hysteresis position errors result from friction-based relaxation of elastic forces in resilient elements of the motion system. Hysteresis varies greatly with load, acceleration and velocity. The hysteresis error is the deviation between the actual position (or output or response) and the commanded or input position at the point of interest due to hysteresis in the motion or drive system.

A system with hysteresis may reach a number of possible states (Y positions), for an input or a command provided to the system. In other words, the system may exhibit path-dependent states associated with the "Y positions". In contrast, for a deterministic system with no hysteresis, a prediction can be made as to the output state of the system at an instant in time, given only the input to the system at that instant. If the system has hysteresis, in most cases, a prediction cannot be made as to the output without having the history of all previous inputs. In order to predict the output, the entire path that the input followed before it reached its current state value should be taken into consideration, which practically is not possible. It should be noted that, in some cases the hysteresis influence on the motion from a current position to a subsequent position may be predicted accurately enough without taking into consideration the entire path but rather only the last motion accounting. For such cases, prediction of a current position may require only the knowledge of the initial position of the previous motion (resulted in the current position).

Figure 2A:
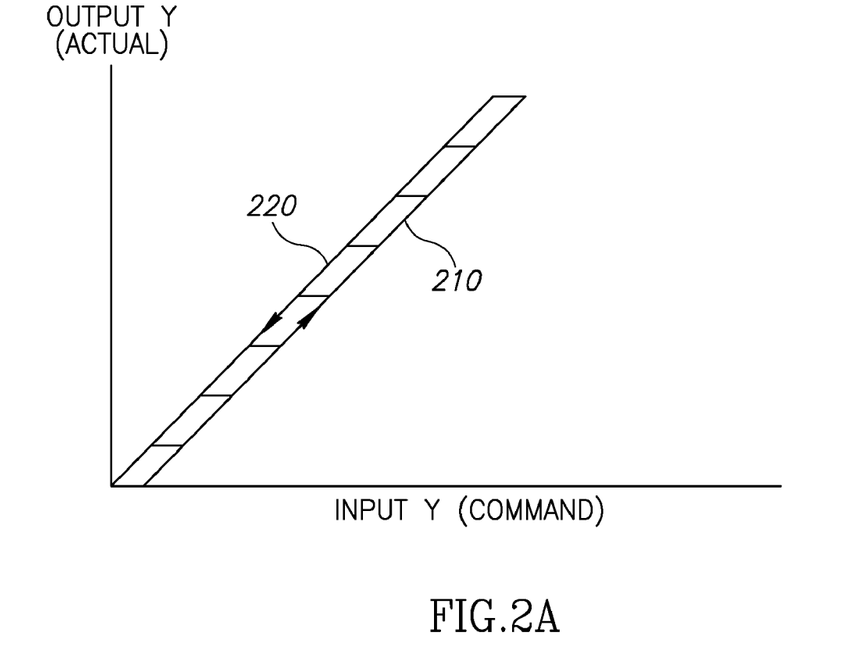
FIG. 2A is a graph representing an actual movement response to an input command in Y direction of a system including backlash errors.

Backlash error is another error in positioning caused by the reversal of travel direction. Backlash is the portion of commanded motion that produces no actual change in position upon reversal of travel direction. In contrast to hysteresis error, backlash may be caused by clearance between rigid elements in the drive system. FIG. 2A demonstrates the movement trajectory of a unit or a shuttle, such as X-motion assembly 135 movable by a drive system that generates backlash errors. The abscissa represents a command or input or a required distance that the drive system should move and the ordinate represents the actual distance that the system has moved. For example, a Y-motion shaft system (not shown) may receive a command to move a printing block to a particular required position but the actual movement may be different from the required distance due to backlash error. However, backlash errors are predictable and may be predetermined and therefore corrected according to the linear graph as shown in FIG. 2A. FIG. 2A shows a first linear path 210 that predicts the actual distance while moving in a first direction and a second linear path 220 that predicts the actual distance while moving in a second direction, opposite to the first direction.

Figure 2B:
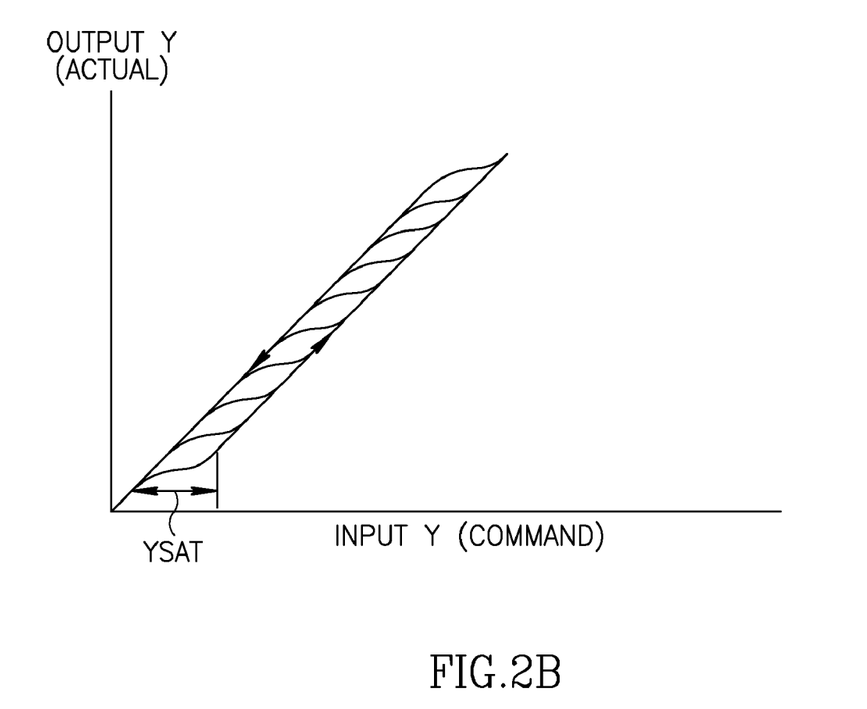
FIG. 2B is a graph representing an actual movement response to an input command in Y direction of a system including hysteresis errors.

FIG. 2B is a graph demonstrates the movement trajectory of a unit or a shuttle, such as X-motion assembly 135 movable by a drive system that generates hysteresis errors. The abscissa represents a command or input or a required distance that the drive system should move and the ordinate represents the actual distance that the system has moved. For example, Y-motion assembly 145 may receive a command to move printing block 130 to a particular required position but the actual movement may be different from the required distance due to hysteresis error. As will be explained in details with respect to FIG. 5, when commanding or instructing a drive system to move distances, for example, 2-3 times smaller than $Y_{SAT}$ in opposite directions from each other, the actual final position cannot be predicted, due to the hysteresis behavior of the resilient elements of the system.

The hysteresis characteristics may vary as a function of the average tension of belt 180. The average tension of the belt is the tension of the belt when the drive system is in rest and the belt does not move. According to embodiments of the invention, an exemplary method for adjusting the tension of belt 180 in order to reduce or eliminate hysteresis errors is provided. According to embodiments of the present invention, the adjustment of the belt tension may be performed by controlling the force which may push drive wheel 170 and idle wheel 160 apart from each other.

Figure 3A:
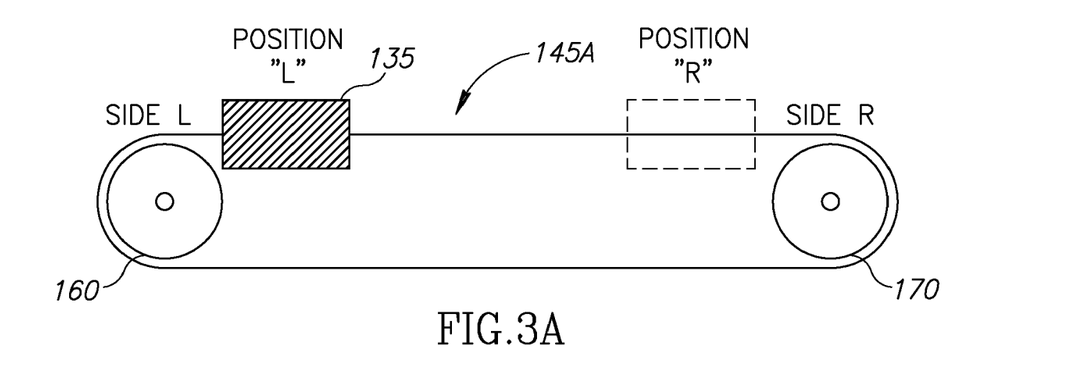
FIGS. 3A-3D are illustrations of a belt tension adjustment procedure for measuring the effect of hysteresis according to embodiments of the invention.
Figure 3B:
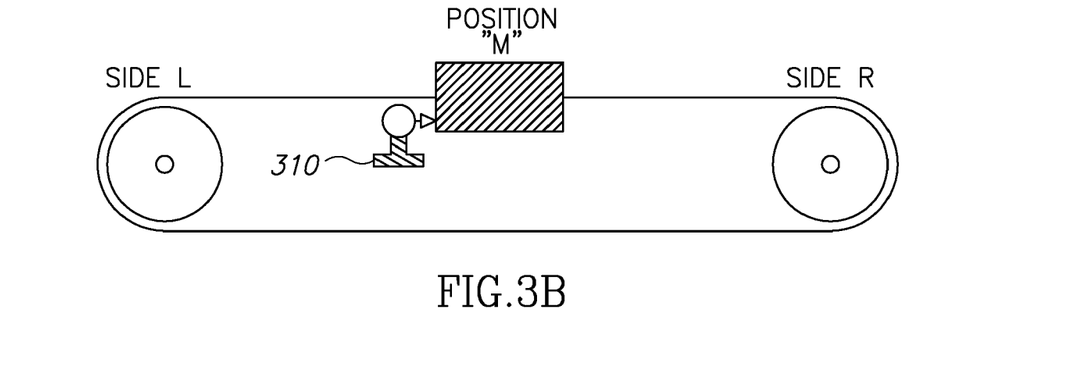

Reference is now made to FIGS. 3A-3D illustrating a belt tension adjustment procedure for measuring the effect of hysteresis on the inconsistency of Y motions according to embodiments of the invention. A procedure of measuring the hysteresis effect may include adjusting the tension of the belt(s) to a selected first tension value, for example, 150 Newtons. Next, the method may include instructing Y-motion assembly 145 to move X-motion assembly 135 together with printing block 130 (shown in FIG. 2) in a first direction, e.g., the left direction, from a first position "R" at the right side of belt system 145A to a second position "L" at the left side of belt system 145A as shown in FIG. 3A. The procedure may further include moving X-motion assembly 135 in a second direction, opposite to the first direction, e.g., from position "L" to position "M" (middle) located between position "L" and position "R" as shown in FIG. 3B. A distance indicator 310 may be located at position "M", for example, on a stationary reference frame to measure the precise position of X-motion assembly 135 and printing block 130 and to nullify the reading of indicator 310 at position "M".

Figure 3C:
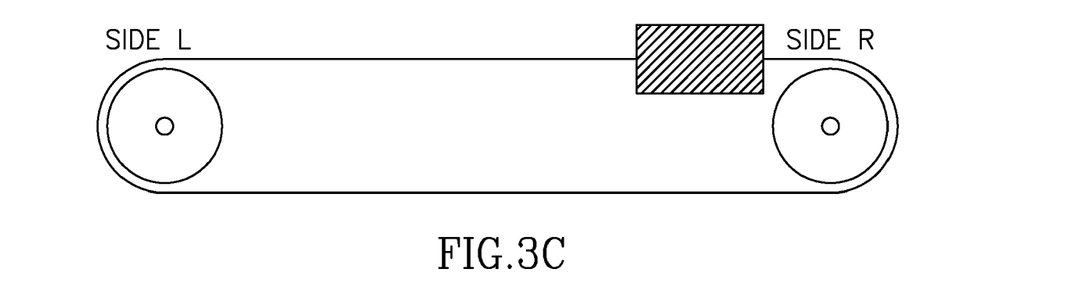
Figure 3D:
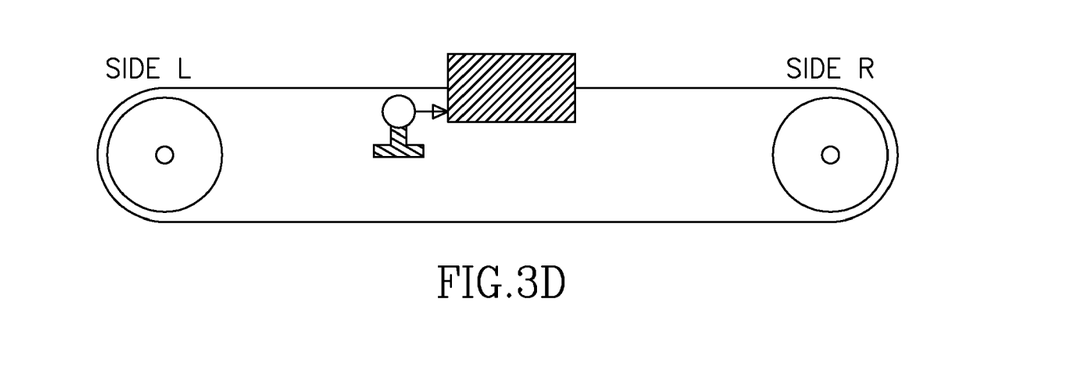

As shown in FIG. 3C, the method may further include instructing Y-motion assembly 145 to move X-motion assembly 135 in the second direction, e.g., in the right direction from position "M" to a position relatively close to position "R". This may be done, for example, by commanding a stepper motor to advance a certain number of steps. Then, the method may further include instructing X-motion assembly 135 to move back in the first direction, to position "M" by commanding the stepper motor to rotate the same number of steps in the opposite direction, as shown in FIG. 3D. At position "M", indicator 310 may measure the actual position "M" and the error (Δ) between the actual positions of "M", before and after the last movements to and from position "M" may be calculated.

According to embodiments of the invention, the difference or distance error Δ may be used as a measure of amplitude of the hysteresis error. A negative distance error value may indicate that after reversing the direction of movement the printing block has not reached position "M" due to hysteresis and a positive distance error value may indicate that after reversing the direction of movement the printing block has passed the position "M" due to hysteresis. According to embodiments of the invention, the method may further include changing the tension of the belt and repeating the procedure described above with the new tension. For example the tension may be changed to a new value of 50 Newton. The procedure may be repeated for different tensions until the distance error is below a predetermined threshold, for example below 20 micrometer.

Figure 4:
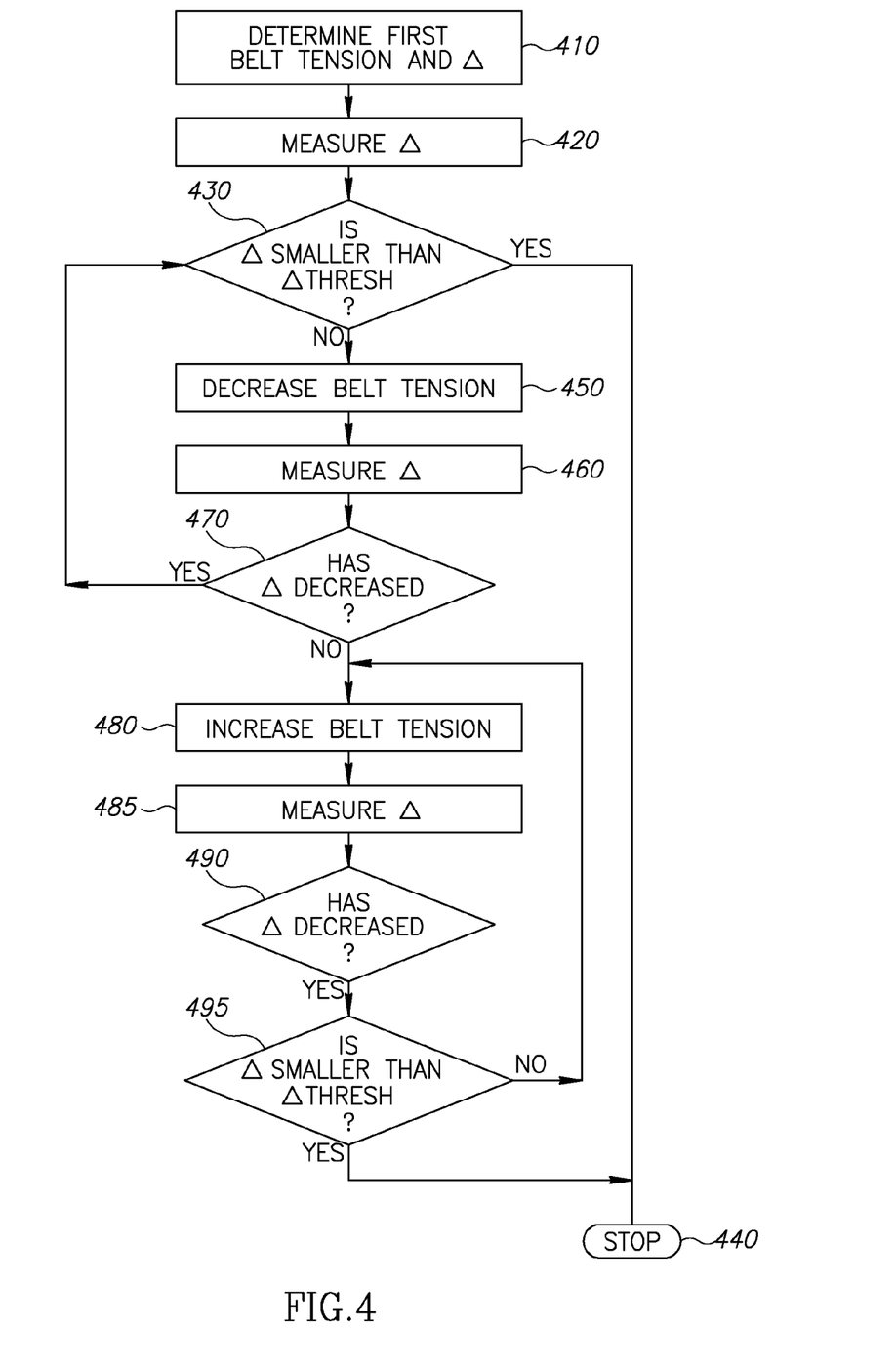
FIG. 4 is a schematic flow chart illustrating a belt tension adjustment procedure according to embodiments of the invention.

Reference is now made to FIG. 4 which is a schematic flow chart illustrating a belt tension adjustment procedure helpful in demonstrating embodiments of the invention. As indicated at box 410, the method may include adjusting the tension of the resilient element, e.g., a belt, to a selected first tension value, for example, 150 Newton. As indicated at box 420, the method may further include performing the procedure for calculating or measuring the error value Δ which may represent the error between actual positions of "M", before and after the last movements to and from position "M" described with reference to FIGS. 3A-3D. As indicated at box 430 the calculated error value Δ may be compared to a predetermined error threshold "Δth" and if Δ is smaller than Δth, the procedure may be stopped as indicated at box 440. Δth may be, for example, below 20 micrometer.

If Δ is not smaller than Δth, the method may include decreasing the tension of the belt as indicated at box 450 and repeating the procedure with the new tension and measuring a new error value "Δnew" as described above with reference to FIGS. 3A-3D and as indicated at box 460. The procedure may further include a comparison between Δ and Δnew as indicated at box 470, if Δnew is smaller than Δ, the method may again compare Δ to Δth as indicated at box 430. If Δnew is not smaller than Δ, the method may include increasing the tension of the belt as indicated at box 480.

The method may further include repeating the procedure with the new tension and measuring a new error value "Δnew" as described above with reference to FIGS. 3A-3D and as indicated at box 485. As indicated at box 490, a comparison between Δ and Δnew' may be performed. If Δnew' is smaller than Δ, the method may again compare Δ to Δth as indicated at box 495 and may stop the procedure as indicated at box 440 if Δnew' is smaller than Δth. If Δnew is not smaller than Δth, the method may include increasing again the tension of the belt as indicated at box 480.

According to embodiments of the invention, the tension may be adjusted within a predetermined tension limits, e.g. within the range from 20 to 170 Newton.

Changing the tension of belt 180 may be performed by rotating a screw that connects a bracket that holds both ends of the axle of idle wheel 160 to the machine main frame, to change the distance between drive wheel 170 and idle wheel 160. Both the force "F" between the wheels and the tension "T" of the belt are changed as a function of the distance between the wheels. It was found, based on measurements performed on a Kevlar® type belt of Gates Corporation model LL Urethane/KEVLAR®-FDA/USDA, 3 mm Pitch-HTD that when the distance error is negative decreasing the tension of the belt may decrease the absolute value of the distance error. A further decrease in the belt tension, for example to 30 Newton may change the direction of the error so that the distance error Δ may become positive. Accordingly, it should be understood to a person skilled in the art that by choosing a certain belt tension, the distance error may become zero thus eliminating the effect of hysteresis. Below, presented at Table 1, are experimental results obtained by measurements performed on a Kevlar® type belt, of Gates Corporation model LL Urethane/KEVLAR®-FDA/USDA, 3 mm Pitch-HTD:

TABLE 1

| Belt tension T (Newton) | Error Δ in returning back (Micron) |
|---|---|
| 150 | −140 |
| 50 | 5 |
| 30 | 20 |

The tension was adjusted so as to substantially eliminate the hysteresis effect. The adjustment was effective for 4-5 months after which a further adjustment procedure was required to maintain the small error distance.

Further embodiments of the present invention may provide other methods for calibration and correction of hysteresis errors by automatically correcting the error using software in the form of instructions stored on a computer-storage medium.

Figure 5:
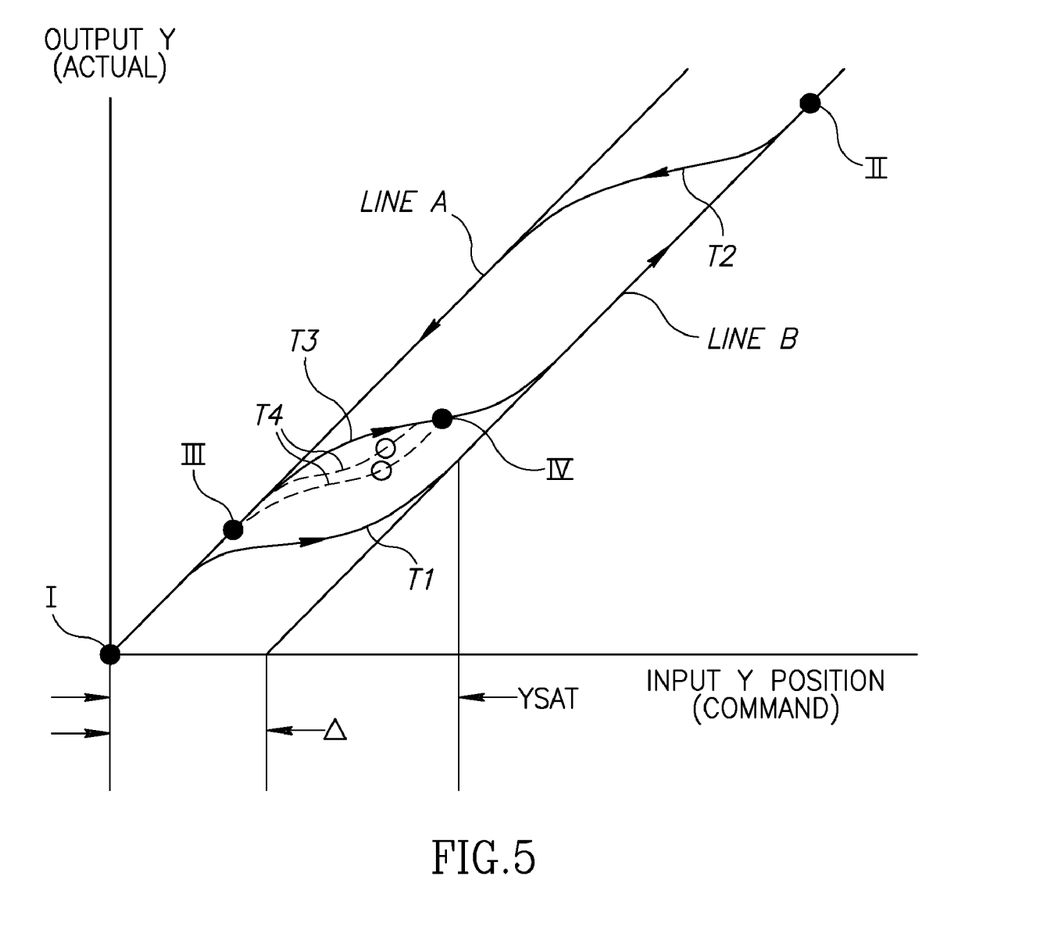
FIG. 5 is graph representing motion trajectories with hysteresis helpful in demonstrating embodiments of the invention.

Reference is now made to FIG. 5, which is a graph representing hysteresis trajectories in a plane represented by output positions versus input positions, demonstrating the difficulties in predicting hysteresis errors for small distances. The abscissa represents a commanded or required position to which the drive system should move (Input state or position) and the ordinate represents the actual position to which the system has moved (Output state or position). X-motion assembly 135 with printing block 130 of FIG. 1 may be moved in the indexing direction (Y) by Y-motion assembly 145 that may comprise resilient elements such as belts. It may be decided that the positive direction of Y axis in FIGS. 1, 2 and 5 is from left to right.

As shown by FIG. 5, a first instruction may instruct printing block 130 to move in a first direction (e.g. to the right) from a first position "I" represented by (0,0) to a second position II. Due to hysteresis, the output is not equal to the input namely, the actual position is different from the command, and the motion is executed along a first trajectory T1. Then, a second instruction to move the printing block in a reverse direction from position II to a third position III may be given. The motion is executed along a second trajectory T2. The actual positions of the second position II and the third position III, as well as the trajectories T1 and T2 may be predicted since both instructions involve movements' distances that are larger than a threshold $Y_{SAT}$. $Y_{SAT}$ may represent the minimal distance that the printing block should move after reversal of movement direction, until the relationship between the commanded and actual movement becomes linear. Positions being on the linear portions of a trajectory in FIG. 5 are regarded as being within the saturation zone of the resilient element and the threshold value $Y_{SAT}$ is denominated as the "saturation" threshold. Since each of positions I, II and III is on either line A or line B, all the three are in the saturated zone of the resilient element and therefore, given a command to move from one position of these three to another, the actual position of the target position may be easily predicted by using a linear equation.

A third instruction to move printing block 130 in the positive direction from position III to position IV may be given. This command may result in moving printing block 130 in an opposite direction than the preceding movement and in a distance shorter than $Y_{SAT}$. Even though the distance between position III and position IV is smaller than the saturation threshold, the actual position of position IV on trajectory T3 may be predicted using complex calculations as the start position of the movement is within the saturation zone.

A forth instruction to move printing block 130 in the negative direction, which is opposite to the preceding direction, from position IV to position V (not shown) at a relatively small distance from position IV, may be given. In this case, the initial, namely position IV, is not within the saturated zone of the resilient element (or of the hysteresis curve), but rather in a non-saturated and non-linear zone. Therefore it may be practically impossible to predict the actual trajectory T4 from position IV towards position V, consequently the actual position V cannot be predicted, as illustrated by the dashed trajectories and the circles thereon.

As illustrated by FIG. 5, the inability to accurately predict the actual position (or hysteresis error) which is required for managing high-precision positioning may hold for any two consecutive movements, given that the first of which is in opposite directions to its preceding movement, and the second is in opposite direction to the first one, and both movements are shorter than $T_{SAT}$. Even when the movement is opposite to its preceding movement, when the movement is larger than $T_{SAT}$ the actual position of the end point may be easily predicted. In such cases, the actual position of the end point may be predicted without the prediction of the entire trajectory.

According to embodiments of the invention, control and management of the movements of printing block 130 in the Y direction may include limiting the movements in a way that a required position (state) may never fall in the unsaturated zone between line A and B of FIG. 4. This principle may be accomplished by assuring that every movement command that includes reversing the direction of the movement may move block 130 by a distance of at least $Y_{SAT}$. An exemption of the requirements of moving only by movements larger than $Y_{SAT}$, may include very small movements, smaller than a second predetermined threshold $Y_{SMALL}$. $Y_{SMALL}$ may equal, for example, 1 mm or 1/100 of $Y_{SAT}$.

As may be seen from FIG. 5, movements smaller than $Y_{SMALL}$ on the saturated zones (lines A and B) are practically not influenced by hysteresis, therefore no correction is needed for such small movements. However, an accumulation of such small movements that may move the block to the unsaturated zone should be prevented. Such small movements in the indexing direction may be required for example accomplishing interlace indexing movement. Interlace may be defined as small shift of block 130 in Y direction between two consecutive scans of a layer by a portion of nozzle spacing, for example, by half a nozzle spacing.

Figure 6:
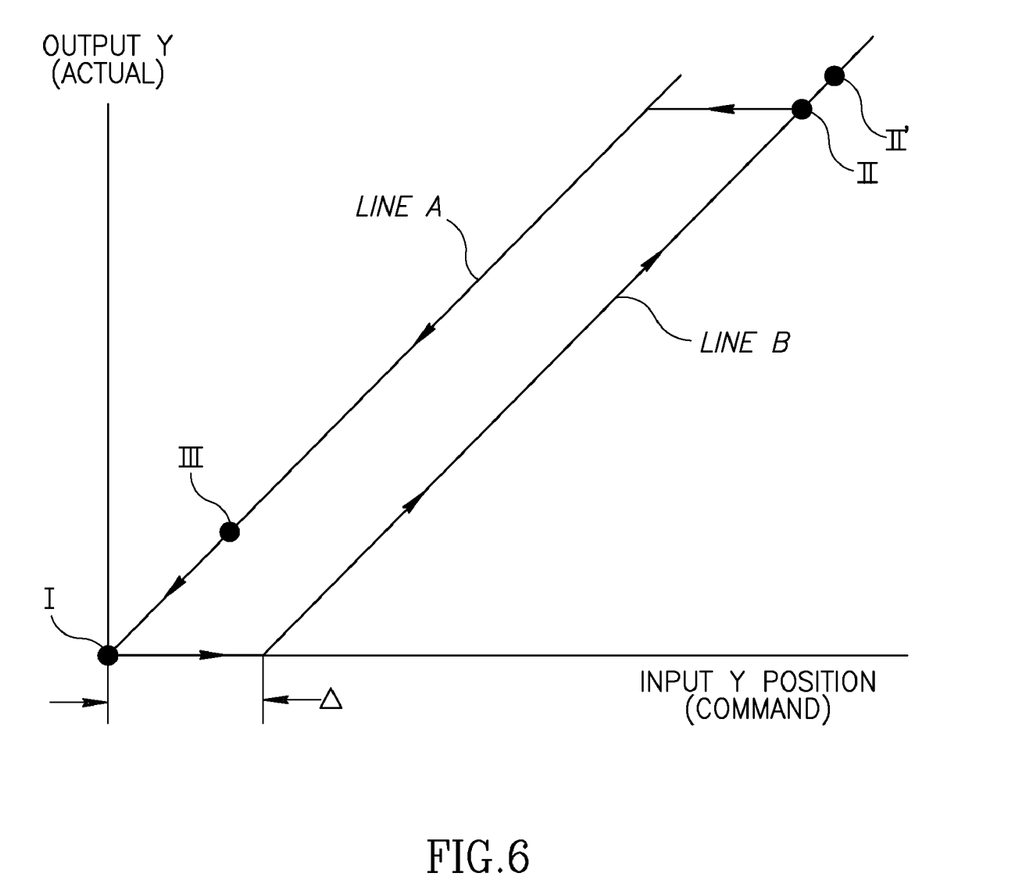
FIG. 6 is an illustration of a graph demonstrating a method of correcting motions with hysteresis errors that are longer than a saturation threshold according to embodiments of the invention.

For a movement larger than $Y_{SAT}$, in opposite direction to the preceding large movement, the correction of the hysteresis error is similar to a backlash error correction in drive system with rigid elements, and may include adding or subtracting an offset parameter ($\Delta$) from the command motion, as illustrated by FIG. 6. The value of $\Delta$ may be taken from the horizontal distance between lines A and B in FIG. 5 and it may be specific to the individual drive system. Predicting the actual positions may be performed by software stored for example in controller 120. Controller 120 may control motor 140 and the positioning of printing head 130. While moving in such a long movement, the resilient elements of the drive system may be stretched to a saturation limit at which point the resilient element is said to be in its saturation state. When the resilient element is in a saturation state, it may travel along a saturation zone (lines A or B of FIG. 5).

Reference is made now to FIG. 6, which illustrates corrections for long motions with hysteresis described in relation to FIG. 5, helpful in understanding embodiments of the invention. The X-axis of the graph represents a commanded or required distance that a drive system should move (Input position) and the Y-axis of the graph represents the actual distance that the system has moved (Output position). For the first instruction, described in relation to FIG. 5, to move printing block 130 from position I to position II, where the preceding motion was in the opposite direction, the command may be corrected by adding the offset parameter $\Delta$ to the actual distance between positions I and II. It should be noted that if the next movement is in the same direction, for example to position II', there is no need for any correction and the command would be to move a distance equal to the actual distance between position II and position II'.

For the second instruction, described in relation to FIG. 5, in order to move printing block 130 from actual position II to position III in the negative direction of Y, where the preceding motion was in the opposite direction, the command may be corrected by adding the offset parameter $\Delta$ to the actual distance between positions II and III. In other words, the command (input) may include an instruction to move printing block 130 an amount equal to $(Y^{III}_{ACTUAL} - Y^{II}_{ACTUAL} + \Delta)$. It should be noted that if the next movement is in the same direction (the negative direction of Y), for example back to position I, there is no need for any correction and the command would be to move a distance equal to the actual distance between position III and position I.

Figure 7:
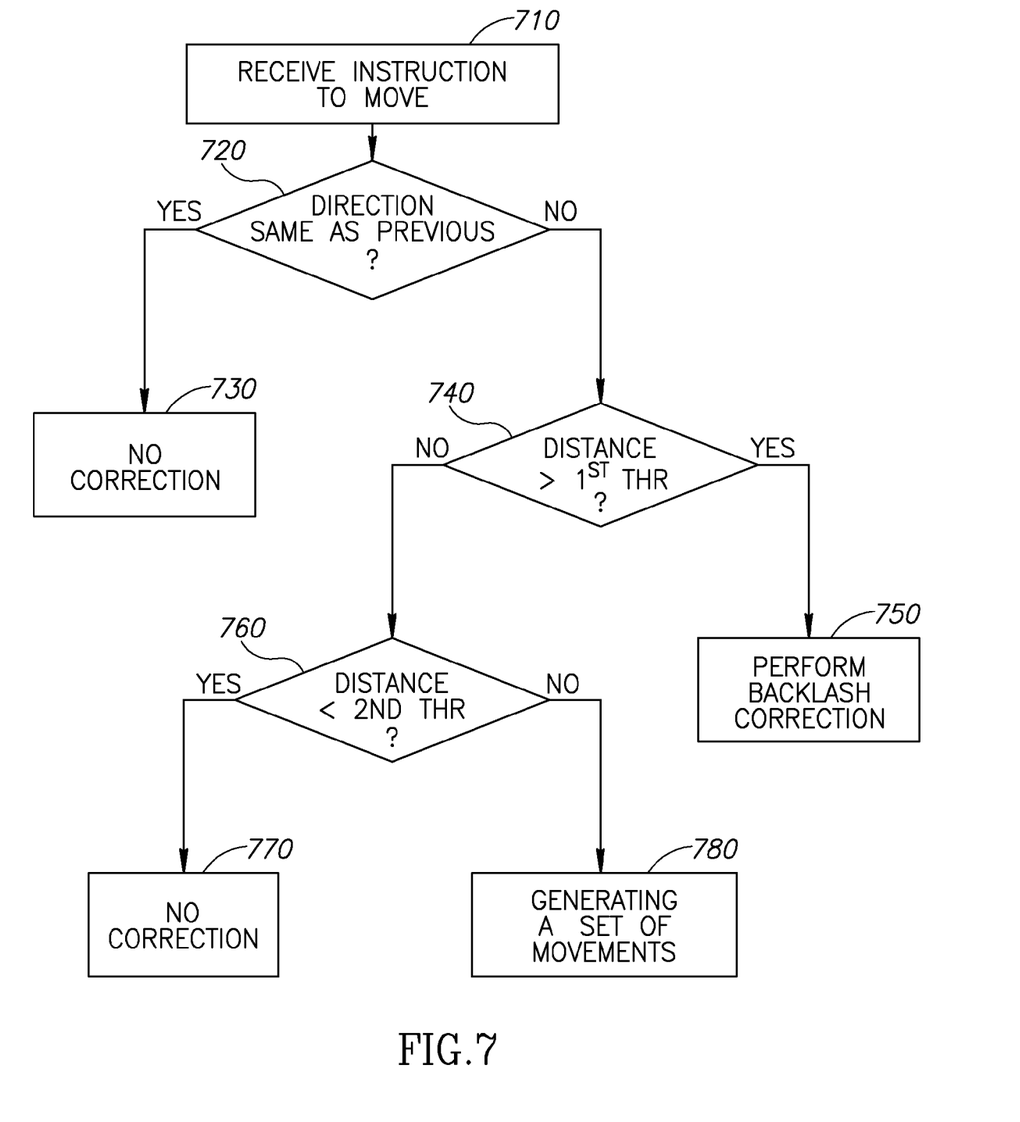
FIG. 7 is a flowchart diagram for a method of correcting hysteresis errors according to embodiments of the invention.

Reference is now made to FIG. 7, which is a flowchart diagram of a method for controlling hysteresis errors according to embodiments of the invention. The method may include receiving an instruction to move, also referred to herein as "command", a printing block to a new position in the indexing direction as indicated at box 710. Then, the method may include checking if the direction of required movement is the same as the direction of the previous command as indicated at box 720. If the direction of the required movement is the same as the direction of the previous movement, no correction due to hysteresis is required as indicated at box 730. If the direction of the required movement is not the same as the direction of the previous movement and the current movement is in the opposite direction then the method may include checking if the distance from the current position to the requested position is larger than a first threshold parameter (Ysat) as indicated at box 740. If the distance from the current position to the requested position is larger than a first threshold parameter, a simple backlash correction due to hysteresis is required and may be performed as indicated at box 750. If the distance from the current position to the requested position is not larger than a first threshold parameter, the method may include checking if the distance from the current position to the requested position is smaller than a second threshold parameter (Ysmall) as indicated at box 760. If the distance from the current position to the requested position is smaller than a second threshold parameter, no correction due to hysteresis is required as indicated at box 770. If the distance from the current position to the requested position is not smaller than a second threshold parameter, then the method may include generating a set of at least two movements commands, the first of which is to move printing head 130 in opposite direction to the preceding movement, and the second of which is to move printing head 130 in opposite direction to the first so that the final position would be the requested position, where each of movements is larger than the first threshold parameter $Y_{SAT}$ as indicated at box 780.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

Some embodiments of the present invention may be implemented in software for execution by a processor-based system. For example, embodiments of the invention may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EE- PROMs), magnetic or optical cards, or any type of media suitable for storing electronic instructions, including programmable storage devices.

Such a system may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method for accurate positioning of a unit movable by a drive system, the method comprising:
    adjusting tension of a resilient element of the drive system such that hysteresis motion errors of the resilient element remain below a predetermined threshold, wherein adjusting comprises:
    measuring, for two or more tension values, the hysteresis motion errors of the resilient element; and
    selecting a tension value for which a hysteresis motion error is below the threshold.

2. The method of claim 1, wherein measurements of hysteresis errors at two different tension values are used to predict a desired tension value which corresponds to a reduced hysteresis error.

3. The method of claim 1, wherein measuring comprises:
    instructing the drive system to move the unit in a first direction to a first end position;
    instructing the drive system to move the unit in a second direction, opposite the first direction, to a desired middle position;
    measuring a first middle position to which the unit has arrived;
    instructing the drive system to move the unit a first distance in the second direction to a second end position;
    instructing the drive system to move the unit the first distance in the first direction towards the desired middle position;
    measuring a second middle position to which the unit has arrived;
    calculating the distance between the first middle position and the second middle position; and
    changing the tension of the resilient element if the distance between the first middle position and the second middle position that represents the hysteresis error is above a predetermined threshold.

4. The method of claim 3, wherein measurements of hysteresis errors at two different tension values are used to predict a desired tension value which corresponds to a reduced hysteresis error.

5. The method of claim 3, wherein the resilient element is a belt movable by a drive wheel.

6. The method of claim 5, wherein the unit is attached to the belt.

7. The method of claim 1, wherein the unit is a printing block.

8. A method for reducing hysteresis errors in a drive system having a resilient element, the method comprising:
    receiving a request to move a unit connected to the drive system a desired distance, smaller than a first threshold and larger than a second threshold, from a first position to a second position in a desired direction opposite to a direction of a previous movement command; and
    generating a first and second consecutive commands, the first command is to move the unit in a first direction and the second command is to move the unit in a second direction opposite to the first direction and the first and second commands are to move the unit a distance larger than the first threshold, such that the sum of the first and second commands is equal to a single command to move the unit the desired distance in the desired direction.

9. The method of claim 8, wherein the first threshold is between 40 millimeters and 60 millimeters.

10. The method of claim 8, wherein the second threshold is between 1 millimeters and 3 millimeters.

11. The method of claim 8, wherein the first direction is the same as the desired direction.

12. The method of claim 8, further comprising:
    receiving a request to move the unit a desired distance larger than the first threshold from a third position to a fourth position in a direction opposite to the direction of a previous movement command; and
    adjusting a command to move the unit the desired distance using an offset parameter.

13. The method of claim 12, wherein the offset parameter corresponds to a backlash correction parameter.

* * * * *